US006269335B1

(12) United States Patent
Ittycheriah et al.

(10) Patent No.: US 6,269,335 B1
(45) Date of Patent: Jul. 31, 2001

(54) APPARATUS AND METHODS FOR IDENTIFYING HOMOPHONES AMONG WORDS IN A SPEECH RECOGNITION SYSTEM

(75) Inventors: Abraham Ittycheriah; Stephane Herman Maes, both of Danbury, CT (US); Michael Daniel Monkowski, New Windsor, NY (US); Jeffrey Scott Sorensen, Seymour, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/134,261

(22) Filed: Aug. 14, 1998

(51) Int. Cl.[7] ................................................. G10L 21/00
(52) U.S. Cl. .......................... 704/270; 704/276; 704/239
(58) Field of Search .................................. 704/270, 271, 704/272, 275, 278, 246, 268

(56) References Cited

U.S. PATENT DOCUMENTS

| 4,829,576 | 5/1989 | Porter ....................................... 381/43 |
| 4,918,732 | 4/1990 | Gerson et al. ........................... 381/43 |
| 5,033,087 | 7/1991 | Bahl et al. ............................... 381/43 |
| 5,218,668 | 6/1993 | Higgins et al. ....................... 704/200 |
| 5,349,645 | 9/1994 | Zhao ....................................... 704/243 |
| 5,621,857 | 4/1997 | Cole et al. ............................ 704/232 |
| 5,625,748 | 4/1997 | McDonough et al. ................ 704/251 |
| 5,675,704 | 10/1997 | Juang et al. .......................... 704/246 |
| 5,680,511 | 10/1997 | Baker et al. ......................... 704/257 |
| 5,715,367 | 2/1998 | Gillick et al. ........................ 704/254 |
| 5,752,001 | * 5/1998 | Dulong ................................. 395/500 |
| 5,778,344 | * 6/1998 | Attwater et al. ..................... 704/275 |
| 5,850,627 | 12/1998 | Gould et al. .......................... 704/231 |
| 5,852,801 | 12/1998 | Hon et al. ............................. 704/244 |
| 5,864,810 | 1/1999 | Digalakis et al. .................... 704/255 |
| 6,005,549 | * 12/1999 | Forest ................................... 345/157 |
| 6,023,673 | 2/2000 | Bakis et al. .......................... 704/231 |

\* cited by examiner

*Primary Examiner*—David Hudspeth
*Assistant Examiner*—Susan Wieland
(74) *Attorney, Agent, or Firm*—F. Chau & Associates, LLP

(57) ABSTRACT

A method of identifying homophones of a word uttered by a user from at least a portion of existing words of a vocabulary of a speech recognition engine comprises the steps of: a user uttering the word; decoding the uttered word; computing respective measures between the decoded word and at least a portion of the other existing vocabulary words, the respective measures indicative of acoustic similarity between the word and the at least a portion of other existing words; if at least one measure is within a threshold range, indicating, to the user, results associated with the at least one measure, the results preferably including the decoded word and the other existing vocabulary word associated with the at least one measure; and the user preferably making a selection depending on the word the user intended to utter.

39 Claims, 5 Drawing Sheets

APPARATUS AND METHODS FOR IDENTIFYING HOMOPHONES AMONG WORDS IN A SPEECH RECOGNITION SYSTEM

CROSS REFERENCE TO RELATED APPLICATIONS

This application is being filed concurrent with U.S. patent application Ser. No. 09/134,582 entitled "APPARATUS AND METHODS FOR IDENTIFYING POTENTIAL ACOUSTIC CONFUSIBILITY AMONG WORDS IN A SPEECH RECOGNITION SYSTEM" and U.S. patent application Ser. No. 09/134,259 entitled "APPARATUS AND METHODS FOR REJECTING CONFUSIBLE WORDS DURING TRAINING ASSOCIATED WITH A SPEECH RECOGNITION SYSTEM".

BACKGROUND OF THE INVENTION

The invention relates to speech recognition and, more particularly, to apparatus and methods for identifying homophones among words in a speech recognition system.

It is generally very difficult to identify which words in an existing vocabulary of a speech recognition engine are or may be confusible with other words in the vocabulary. That is, when a user utters one word that the speech recognizer has been trained to decode, it is possible that the speech recognizer will output the wrong decoded word. This may happen for a variety of reasons, but one typical reason is that the word uttered by the speaker is acoustically similar to other words considered by the speech recognition engine. Mistakes are committed at the level of the output of the recognizer, by misrecognizing a word or dropping a word from an N-best list which, as is known, contains the top N hypotheses for the uttered word.

In addition, with the advent of large vocabulary name recognition employing speech (e.g., a voice telephone dialing application), the problem of resolving which particular spelling of a word was intended by the speaker, when many possible spellings exist within the vocabulary, has added to the difficulty. For example, the two spellings of "Gonzalez" and "Gonsalez" result in similar but perhaps not the same baseforms, as shown below:

| GONZALEZ | \| G AO N Z AO L EH Z |
| GONSALEZ | \| G AO N S AO L EH Z |

Furthermore, many words result in the same baseforms, which are somewhat arbitrarily treated by the speech recognizer. This creates a problem that is often tackled by hand editing the entire vocabulary file, prior to any real-time decoding session, to attempt to remove such potential problems. However, this hand-editing method is not possible if large lists of names are to be automatically incorporated into the vocabulary of the speech recognizer.

This problem exists in other speech recognition areas and up to now has largely been corrected by using the manual approach or using the context to resolve the correct spelling. For example, the words "to", "two" and "too" are familiar examples of homonyms, i.e., words which have the same sound and/or spelling but have different meanings. The approach to detect which one of these words was actually meant when uttered by a speaker has traditionally been to use the context around the word. Some recognizers may even be capable of intelligently noting that the distance of the spoken speech to all of these words will be the same and thus may prevent such extra scoring by first noting that all three may have the same baseform.

U.S. Pat. No. 4,468,756 to Chan discloses a method for processing a spoken language of words corresponding to individual, transcribable character codes of complex configuration which includes displaying a set of homonyms corresponding to a set of homonym set identifying codes. However, these homonyms and related codes are previously classified and stored in files in accordance with known rules of the particular spoken language (e.g., it is known that in Chinese, approximately 230 characters, among the approximately 2700 basic characters, are classified as homonyms). Then, whenever the spoken word corresponds to a word which was previously classified as a homonym, the method discloses using the code to access the homonym file and then displaying the known homonyms from that file. However, the Chan method is disadvantageously inflexible in that it is limited to the pre-stored classified homonyms. Therefore, among other deficiencies, the Chan method cannot perform real-time identification of words in a vocabulary that are acoustically similar to an uttered word and thus cannot display words that are not otherwise pre-classified and stored as homonyms.

Accordingly, it would be highly advantageous to provide methods and apparatus for substantially lowering the decoding error rate associated with a speech recognizer by providing an automatic real-time homophone identification facility for resolving the intended word in cooperation with the user without regard to known homophone rules of any particular spoken language. It would also be highly advantageous if the results of the homophone identification facility could be used in an off-line correction mode.

Further, it would be highly advantageous to use the output of the homophone identification facility to add homophones to the N-best list produced by the speech recognizer. The list could then be used for re-scoring, both acoustic and language model, or error correction in dictation applications.

SUMMARY OF THE INVENTION

This invention provides methods and apparatus for automatically identifying homophones in a speech recognition engine vocabulary in response to a word uttered by a speaker and preferably providing means for a user (e.g., speaker) to resolve the intended word from the identified homophones. It is to be appreciated that the present invention applies to the identification not only of homonyms (acoustically similar words) but to the more general category of acoustically similar sounds known as homophones. Accordingly, it is to be understood that the term homophone, as referred to herein, includes acoustically similar single and multiple phone words as well as individual phones themselves, whereby the words or phones may have meanings and/or no meanings at all.

In one aspect of the invention, a method of identifying homophones of a word uttered by a user from at least a portion of existing words of a vocabulary of a speech recognition engine comprises the steps of: decoding the uttered word to yield a decoded word; computing respective measures between the decoded word and at least a portion of the other existing vocabulary words, the respective measures indicative of acoustic similarity between the word and the at least a portion of other existing words; identifying, as homophones of the uttered word, the other existing words associated with measures which correspond to a threshold range.

The method also preferably includes the step of indicating, in real-time, to the user the identified homophones. The manner of indicating the identified homophones may include displaying the results to the user on a CRT display or speech synthesizing the results via a text-to-speech (TTS) system in order to produce a spoken version of the results. The user then preferably makes a selection depending on the word the user intended to utter. He may choose the word he uttered, one of the homophones, or he may choose to utter a new word. The selection may be accomplished in a variety of manners. For example, if the results are displayed on a CRT display, the user may make his selection on the screen using any type of input device, mouse, keyboard, touchscreen, etc. The input device may also be a microphone which permits the user to utter his selections.

It is to be appreciated that the TTS embodiment is preferable in speech recognition applications in telephony environments. For instance, such an embodiment is adaptable to IVR (interactive voice response) and directed initiative systems, where a prompted dialog naturally exists between a user and a machine, e.g., a call center IVR for order taking or form filing, like a retail catalog/ordering system. In a voice name dialing application, the user may provide a request and the TTS system permits the recognition system to provide a response such as: "Do you mean John Smith from Manhattan or John Schmidt from Manhattan?"

Also, rather than provide the user with the results of the homophone identification process at the time of utterance, the present invention preferably provides storing the results and retrieving them at a later time. In this manner, the user or someone else can edit a decoded text using the homophones identified at the time of the utterances to correct decoding errors which occurred at the time of the utterances.

In another aspect of the invention, the results of the homophone identification process may be added to the N-best list generated by the speech recognizer in response to the uttered word. Then, a second decoding pass (e.g., a detailed match, an acoustic re-scoring, a language model re-scoring) is performed using the augmented N-best list in order to yield the result which is considered to be the top hypotheses for the uttered word. In this manner, there is no feedback to the user, rather, the speech recognizer utilizes the results to make the best selection.

Alternatively, the augmented N-best list may be stored and retrieved by the user, or another, for use during an error correction session, as mentioned above. The use of the augmented N-best list is useful when the speech recognizer with which the homophone identification facility of the invention is associated with is used in dictation applications, e.g., such as IBM Corporations' ViaVoice system. In such case, when correcting a word, the user is presented with an N-best list to speed up the correction process by allowing him to simply select the appropriate word, if present in the list. By complementing the list with all the appropriate homophones, the probability that the intended word is presented to the user substantially increases thereby avoiding the user having to type in or verbally spell the intended word. Of course, the user can always select a word that is not in the list, that is, another word from the vocabulary of the speech recognizer.

These and other objects, features and advantages of the present invention will become apparent from the following detailed description of illustrative embodiments thereof, which is to be read in connection with the accompanying drawings in which the same reference numerals are used throughout the various figures to designate same or similar components.

DETAILED DESCRIPTION OF THE PREFERRED EMBODIMENTS

While the following description explains the invention in terms of a single word or command, it is to be understood that the homophone identification facility of the invention may also identify individual acoustically similar phones in response to the utterance of any particular word or phone.

Figure 1:
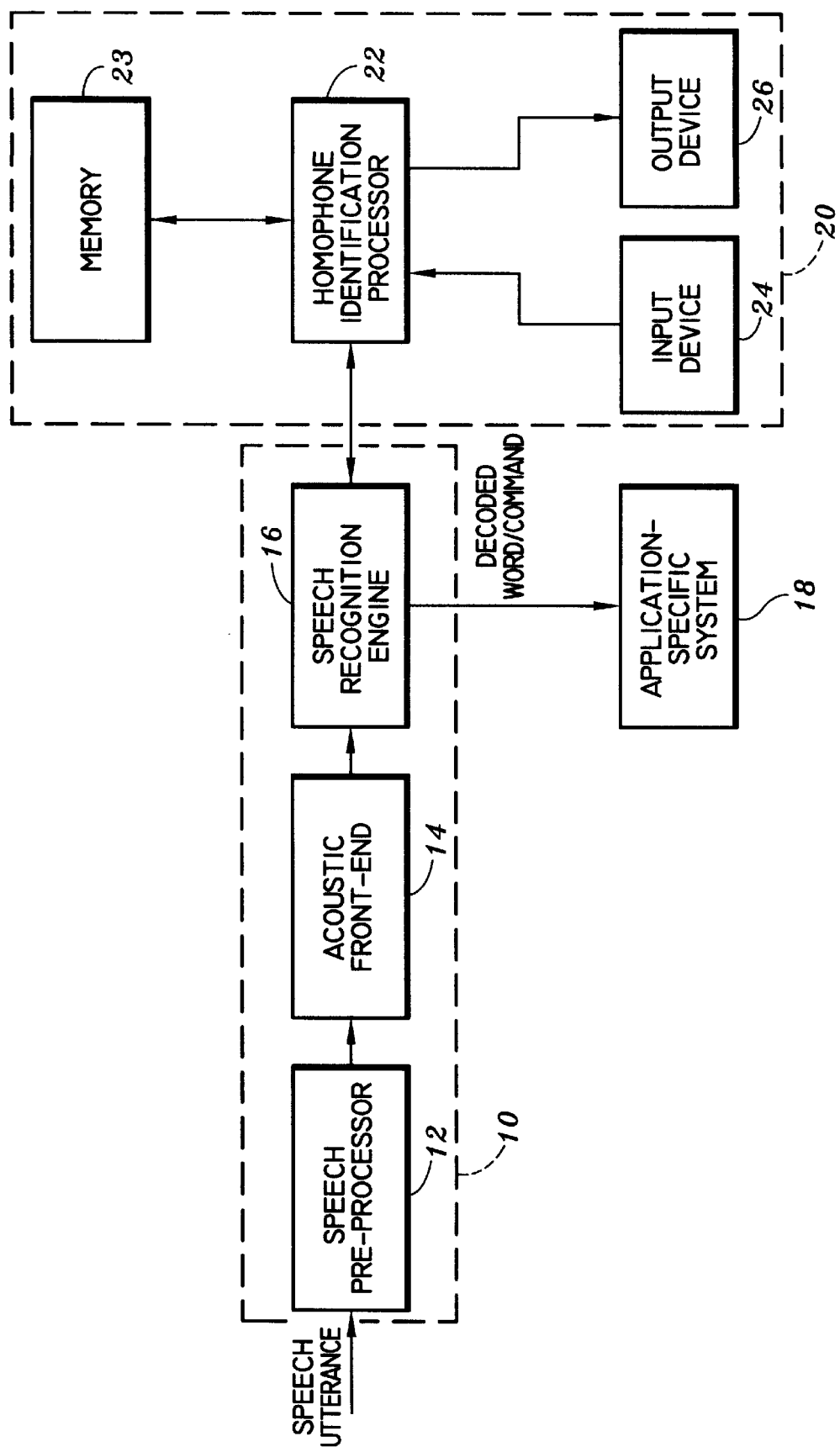
FIG. 1 is a block diagram of a speech recognition system in conjunction with a homophone identification facility according to the present invention.

Referring initially to FIG. 1, a block diagram is shown of: a speech recognition system 10 operatively coupled to an application-specific system 18 and a homophone identification facility 20 according to the present invention. The speech recognition system 10, itself, includes a speech utterance pre-processor 12, an acoustic front-end 14 operatively coupled to the pre-processor 12, and a speech recognition engine 16 operatively coupled to the acoustic front-end 14. It is to be appreciated that the present invention is usable with any speech recognition system and is not, in any way, limited to use with or dependent on any details or methodologies of any particular speech recognition arrangement. For instance, even generalized speech recognition systems such as the commercially available large vocabulary IBM Corporation ViaVoice or ViaVoice Gold systems may be adapted to permit and/or perform homophone identification functions in accordance with the invention. In any case, it should be understood that the elements illustrated in FIG. 1 may be implemented in various forms of hardware, software, or combinations thereof. As such, the main recognition elements (e.g., speech recognition engine) and the homophone identification processor are implemented in software on one or more appropriately programmed general purpose digital computers. Each general purpose digital computer may contain, for example, a central processing unit (CPU) operatively coupled to associated system memory, such as RAM, ROM and a mass storage device, via a computer interface bus. Accordingly, the software modules performing the functions described herein may be stored in ROM or mass storage and then loaded into RAM and executed by the CPU. As a result, FIG. 1 may be considered to include a suitable and preferred processor architecture for practicing the invention which may be achieved by programming the one or more general purpose processors. Of course, special purpose processors may be employed to implement the invention. The speech recognition engine 16 and homophone identification processor 22 are, therefore, functional blocks illustrating the computer facility or facilities executing their respective functions. Memory 23 and input and output devices 24 and 26 are preferably part of the computer facility implementing the functions of the processor 22. Also, the speech pre-processor 12 and/or the acoustic front-end 14 may be implemented via a digital signal processor operatively coupled to such computer facilities (e.g., via the computer interface bus), as is known in the art. Given the teachings of the invention provided herein, one of ordinary skill in the related art will be able to contemplate these and similar implementations of the elements of the invention.

A brief explanation of the functionality of the components of the speech recognition system 10 will now be given. The speech utterance pre-processor 12 receives the speech uttered by a speaker and generates representative speech waveforms. The speech utterance pre-processor 12 may include an audio-to-analog transducer (microphone) and an analog-to-digital converter which respectively transduce the utterances into an electrical signal and then convert the electrical signal into a digital signal representative of the speech uttered. Further, the pre-processor may preferably sample the speech signal and partition the signal into overlapping frames so that each frame is discretely processed by the remainder of the system. The output signal of the pre-processor 12 is the sampled speech waveforms which are provided to an acoustic front-end 14. Alternatively, the acoustic front-end 14 may incorporate the functions of the pre-processor 12.

The acoustic front-end 14 receives the speech waveforms and, as is known in the art, generates feature vectors (signals) therefrom. Physiologically related mel cepstra, delta and delta—delta feature vectors are preferred for efficiency and effectiveness of recognition, although other known feature vectors may be used.

Next, as is known, the speech recognition engine 16 uses the feature vectors provided by the acoustic front-end 14 to perform the process of decoding the word or words uttered by the speaker. The decoded word(s) is then presented to the application-specific system 18. It is to be understood that the application-specific system 18 may be any system that employs the decoded speech signals as input. For example, the system 18 may be a telephone voice dialing system whereby the spoken utterances received by the speech recognition system 10 represent user commands, names of persons to be dialed, etc. By way of another example, the system 18 may be a security access controller which selectively permits or denies access to a facility or service whereby the spoken utterances received by the speech recognition system 10 represent passwords, user identification information, etc. Of course, the above applications are merely examples and, as such, the present invention is not intended to be limited thereby.

Figure 2:
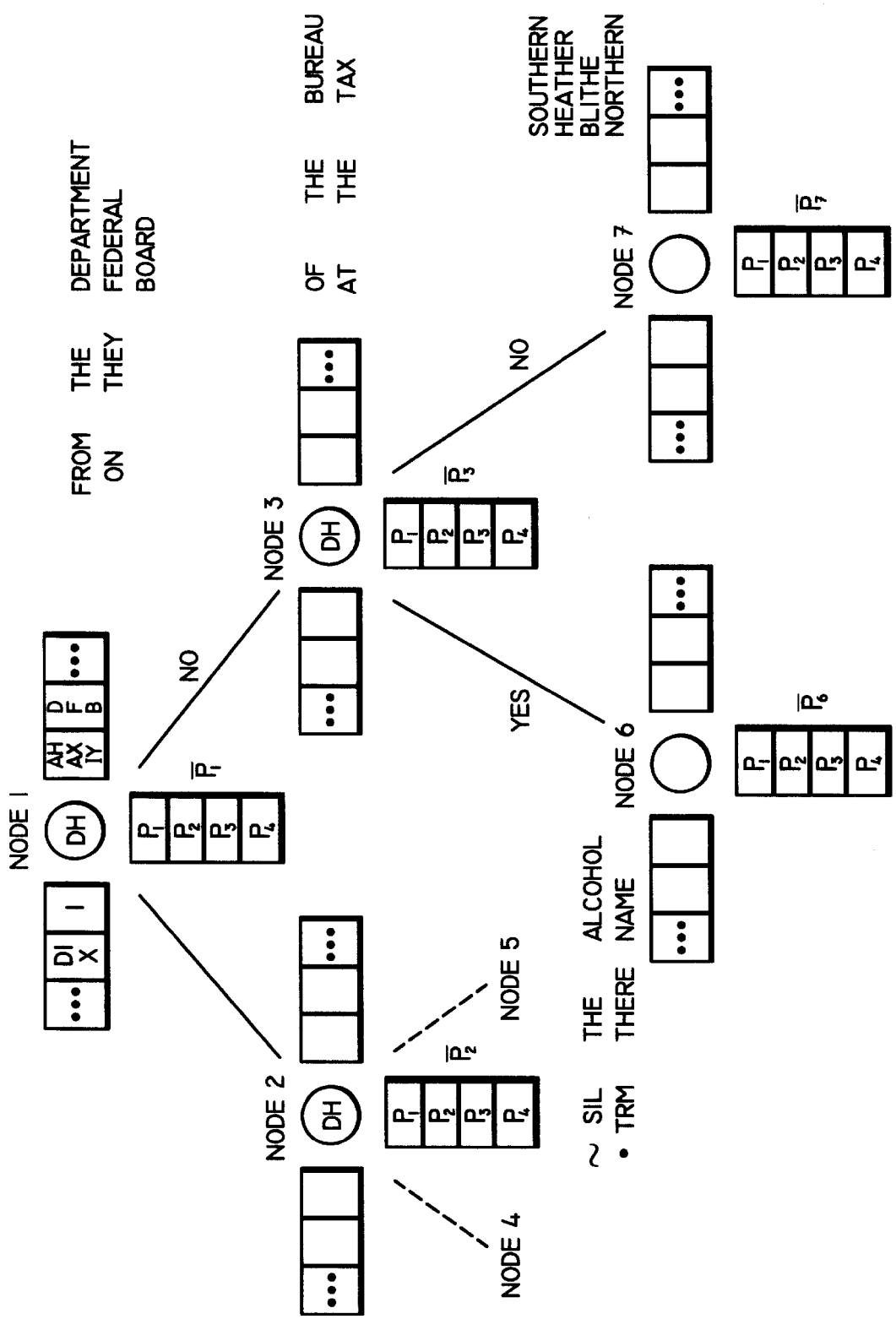
FIG. 2 is a diagram illustrating an example of a decision tree employed in an embodiment of a speech recognition engine.

In a preferred embodiment of the speech recognition engine 16, a decision tree model for each phone in the system is created. Referring to FIG. 2, an illustration of a hierarchical decision tree is shown. The leaves of this tree represent different contexts for each phone. The leaves contain a mixture gaussian prototype typically with 10 mixtures, each mixture with 39 dimensions. In this embodiment, there are fifty-one phones, and each phone has three such trees. Each tree is trained by a set of questions which segment the data. The result is a set of mixture gaussians:

$$\overline{P}_1, \overline{P}_2, \ldots, \overline{P}_n$$

which can be compared as sequences of such prototypes associated to the words. However, the method by which the speech recognition system is trained is not critical to the present invention, as a result, any conventional method may be employed. For example, the systems and methods disclosed in the following articles may be employed: L. R. Bahl et al., "A Fast Approximate Acoustic Match for Large Vocabulary Speech Recognition," IEEE Transactions on Speech and Audio Processing, vol. 1, no. 1, pp 59–67, January 1993 and in L. R. Bahl et al., "Performance of the IBM Large Vocabulary Continuous Speech Recognition System on the ARPA Wall Street Journal Task," ICASSP 1995, vol 1, pp 41–44. The present invention also assumes that the speech recognition engine 16 includes a large vocabulary along with the corresponding lefeme tree and baseforms.

Referring again to FIG. 1, the homophone identification facility 20 of the invention includes a homophone identification processor 22, operatively coupled to the speech recognition engine 16, memory 23 operatively coupled to the processor 22, and an input device 24 and an output device 26, both operatively coupled to the processor 22. As previously mentioned, it is to be understood that the operations performed in accordance with the homophone identification processor 22, to be described below, are preferably accomplished via one or more software modules executed on one or more appropriately programmed general purpose digital computers, for example, as described above. The output device 26 may be a visual display (e.g., CRT) which allows the speaker who uttered a word to be decoded to be informed of words which the homophone identification facility has identified as homophones of the uttered word. That is, the display serves to provide the user with, inter alia, information concerning the acoustic similarity between the uttered word, as decoded, and one or more other existing vocabulary words in the recognition engine. The output device 26 may also be a printer. Alternatively, the output device 26 may be a text-to-speech (TTS) system which takes the results produced by the processor 22 and synthesizes them into speech for audible indication to the user, rather than just visual indication. Any conventional TTS system may be employed for output device 26. The input device 24 may be a standard keyboard or other conventional means (e.g., mouse) for permitting the user to select the word he intended from the homophones identified and displayed on the output device 26. The input device may also be a microphone which permits the user to utter his selections. As mentioned, the input and output devices are preferably part of the computer system performing the functions of the identification processor 22. Also, memory 23 is preferably part of the same computer system and is used in cooperation with the functional software modules executed by processor 22, as will be explained.

A detailed description of preferred methods 100 of identifying homophones in response to an uttered word performed by the homophone identification facility 20 will now be given in the context of FIGS. 3A through 3D.

Accordingly, at step 102 (FIG. 3A), the speaker utters the word or command to be decoded by the speech recognizer 10. The spoken utterance is received and processed by the speech utterance pre-processor 12 and acoustic front-end 14, as explained above. Then, in a conventional manner, the speech recognition engine 16 decodes the uttered word thereby identifying an existing word believed to be the word the speaker uttered (step 104 of FIG. 3A). However, as explained above, due to acoustic similarity among words in the existing vocabulary, it is possible that this may not be the word the speaker uttered.

However, as is known, the speech recognition engine associates a baseform and leaf sequences with all the words in the vocabulary including the decoded word. The baseform of a word is a sequence of phonetic units (e.g., phones) that make up the word. Examples of baseforms for given words may be:

| WORDS | PHONETIC DESCRIPTION |
|---|---|
| A | AX |
| ADAPTER | AX D AE PD T AXR |
| ADAPTERS | AX D AE PD T AXR Z |
| AGENT | EY JH AX N TD |
| AGENTS | EY JH AX N TS |
| AIX | EY AY EH K S |
| ANALYSIS | AX N AE L AX S AX S |
| ANALYSIS | AX N AE L IX S IX S |

Many words may have more than one baseform depending on how they are pronounced. For instance, the word "ANALYSIS" may be pronounced with the vowels "Y" and "I" being a short "A" sound (AX) or a short "I" sound (IX).

Advantageously, in order to overcome the problems associated with erroneous decoding of the uttered word, the homophone identification facility is employed to identify, in real time, the words in the vocabulary which are acoustically similar to the word which the engine identified as the uttered word. In this way, the speaker can confirm that the word identified by the engine is correct or select the word he actually uttered from among the words identified by the homophone identification facility.

Figure 3A:
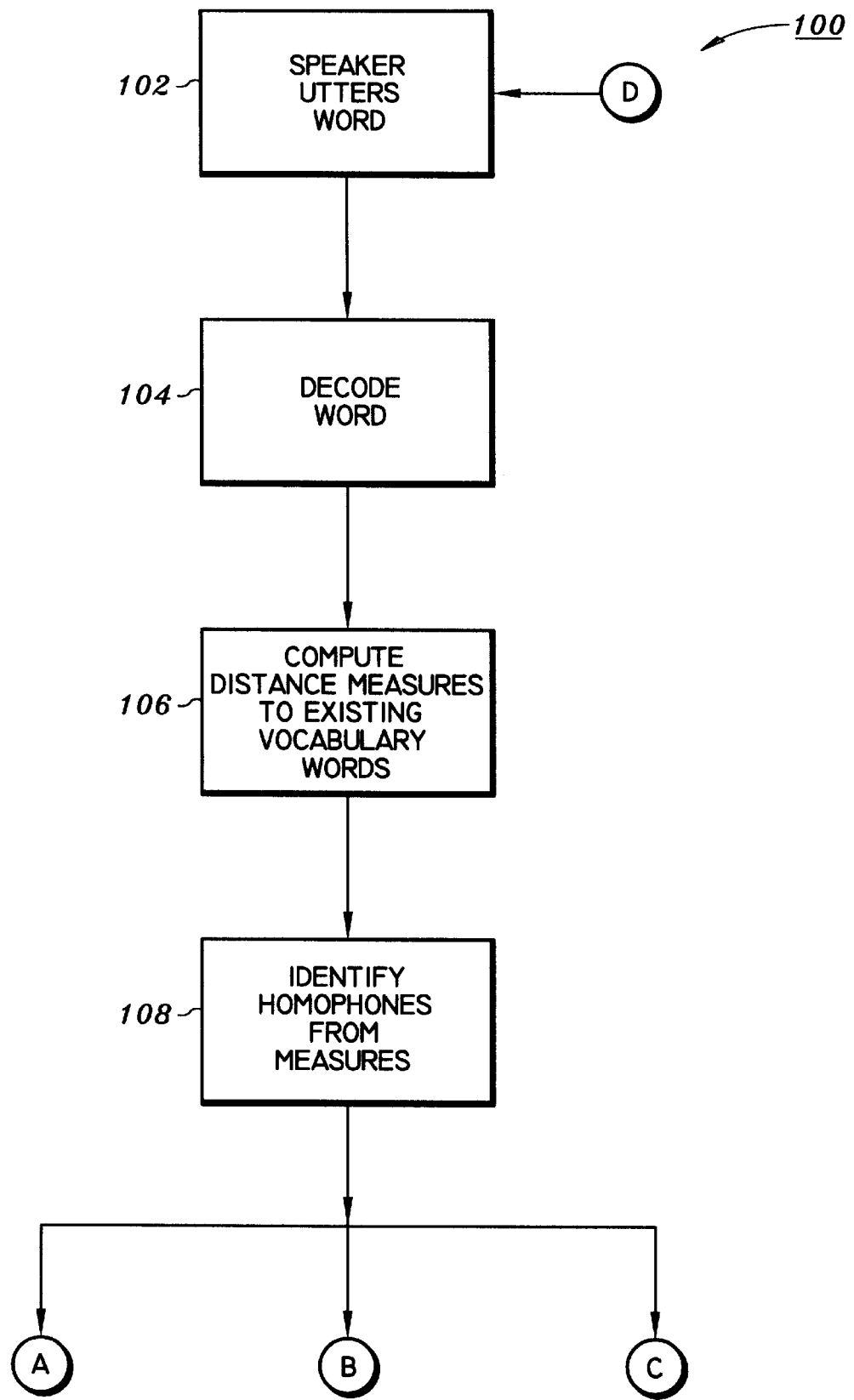
FIGS. 3A through 3D is a flow chart illustrating embodiments of methods of homophone identification according to the present invention.

This is accomplished by first computing respective distance measures, as will be explained, between the word identified by the engine (decoded word) and the other words or a subset of words produced by an N-best algorithm (step 106 of FIG. 3A). Because one (or more) baseforms are respectively associated with the decoded word and each other word in the vocabulary, these baseforms may be previously read from the engine 16 by the homophone identification processor 22 and stored in memory 23. While not critical to the invention, such existing baseforms may be read and permanently stored in memory 23 (e.g., in which case memory 23 could be ROM or hard disk memory) prior to a decoding session or read and temporarily stored in memory 23 (e.g., in which case memory 23 could be RAM) at the time of a decoding session.

It is to be appreciated that the use of baseforms is preferred so that a leaf sequence may also be associated with the baseform for each of the existing words. It is the leaf sequences that are preferably used to determine the degree of acoustic similarity between the decoded word and the other vocabulary words, as will be explained. As is known, a leaf fitting the current phonetic context is extracted from the appropriate decision tree model for each phone of the baseform. Accordingly, a leaf sequence corresponding to the baseform is formed. The leaf sequences for the existing words are preferably previously generated. If generated by the speech recognizer 10, they are read from the recognizer memory by the homophone identification processor 22 and stored in memory 23. If not, the processor 22 may generate the leaf sequences for the existing words directly from their baseforms (utilizing the acoustic models of the recognizer 10) and then store them in memory 23. The manner in which the leaf sequences of the words are generated is not critical to the invention.

In step 106, the lefeme sequence of the decoded word is compared to the lefeme sequences of the other existing words from the recognition engine vocabulary. It is to be appreciated that from this comparison, a set of homophones is identified (step 108). In one embodiment, this list or set is then made available, at the output device 26, to the user for inspection (step 110). As mentioned, the output device 26 may be a display for visual results or a TTS system for spoken results. Thus, instead of the user having to transcribe a large amount of data off-line to identify the homophones associated with a word, the user is presented, in real-time, with a list of acoustically similar words from the existing vocabulary and respective measures of similarity to the decoded word and, thus, can confirm that the engine decoded the correct word or select the correct word from among the set of homophones.

The step of comparing the decoded word to all other existing vocabulary words (step 106) to identify homophones may be accomplished in many ways. A preferred manner involves calculating respective distance measures or scores between the decoded word and the other existing words in the vocabulary. The distance measure associated with the decoded word and any other word from the vocabulary is preferably generated by respectively comparing leaves from the lefeme sequence of the decoded word with leaves from the lefeme sequence of the other existing word. A measure or score is generated for each pair-wise leaf comparison and the total distance measure for the words is calculated by adding up the pair-wise leaf scores.

The homophone identification processor 22 also preferably handles comparisons of unequal words. That is, a decoded word may have more or less phones comprising its baseform than another particular existing word. In this event, comparison is possible by implementing a best alignment process as the comparison process between the words. An example of such a best alignment process is the well-known Viterbi algorithm. The Viterbi alignment process supposes that since the acoustic models of the speech recognition engine are aligned left to right against incoming speech vectors, then when performing distance calculations to find the best match of leaves of a first word to those of a second word, left to right alignment will ensure a best match regardless if the baseforms are unequal in the number of phones.

An example of phonetically unequal length words is as follows:

| TRACE | TR EY S |
|---|---|
| TRAILS | TR EY L S |

The words "TRACE" and "TRAILS" are unequal in phonetic length because they are different by a phone. Another example of the need for an alignment algorithm is in comparing such words as "AUSTIN" and "BOSTON", given several different baseforms for each word. For instance, such possible baseforms may be:

| AUSTIN | AA S T AX N |
|---|---|
| AUSTIN | AO S T AX N |
| AUSTIN'S | AO S T IX N S |
| BOSTON | B AA S T AX N |
| BOSTON | B AO S T AX N |

Accordingly, to generate distance measures, the processor 22 preferably implements Viterbi alignment in order to match words, even of unequal phonetic length.

The distance measures calculated by the homophone identification processor 22 for the comparisons between the decoded word and the other existing words are preferably tabulated. The tabular format may be organized in ranks based on an acoustic similarity threshold value (or values) established within the processor 22. These values can be set by a user prior to real-time use of the homophone identification facility. If, for example, a single threshold value is set, then any existing word which results in a distance measure (as compared to the decoded word) falling at or below the threshold value results in the word being identified as a homophone of the decoded word. Likewise, if the existing word results in a distance measure (as compared to the decoded word) falling above the threshold value, then the word is not identified as a homophone of the decoded word. Of course, homophone identification could easily be set to include measures at or above the threshold value, while non-homophone identification is set to include measures below the threshold value.

Figure 3B:
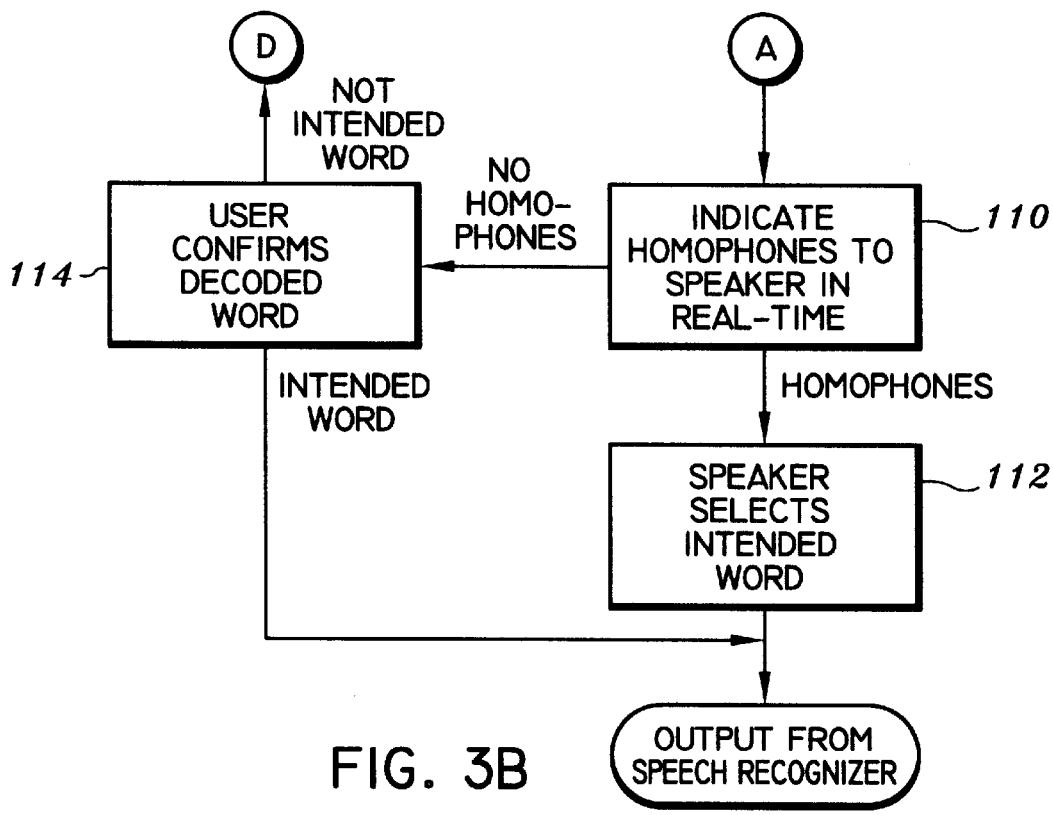
Figure 3C:
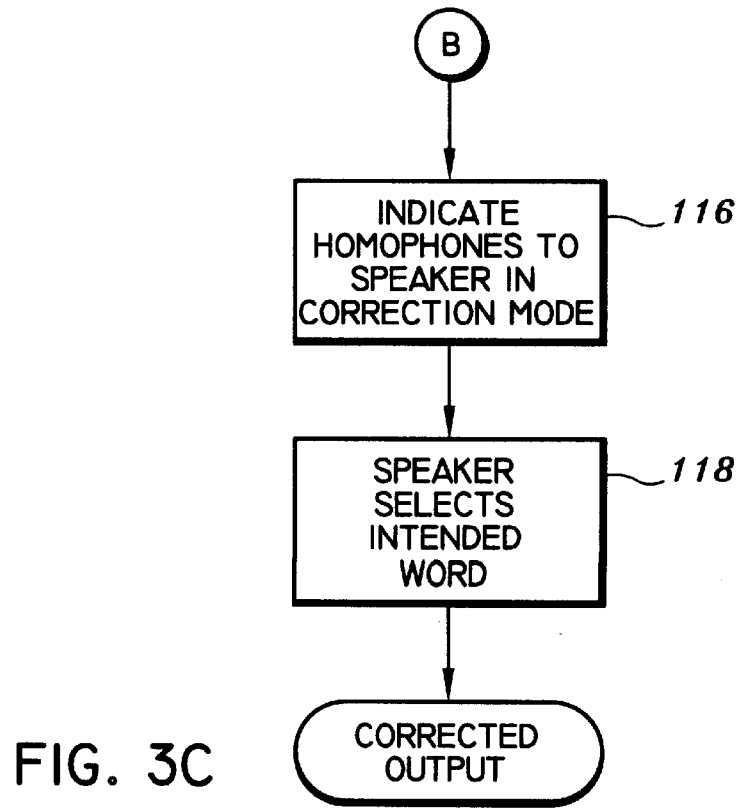

The list of homophones and the decoded word are then preferably displayed to the speaker on display device 26 (step 110 of FIG. 3B). However, the entire table of comparisons (including homophones and non-homophones) can just as easily be provided to the output device 26. Alternatively, as mentioned, the results may be synthesized and played back to the user.

Also, it is to be appreciated that the number of comparisons of the decoded word to other existing words may be reduced such that only a subset of all other existing words are compared to the decoded word. This may be accomplished in several ways. For example, if the decoded word is to be only used as a verb, this could be identified at the input utterance stage by the speaker (step 102) and, as a result, the processor 22 would only compare the decoded word to existing words capable of being verbs, provided that the existing words were also previously so categorized. Similarly, the word may be compared to the top N-best results for the current utterance which yields an acoustically similar set for presentation to the user, for example, during an error correction session.

Nonetheless, an example of such tabular results generated during steps 106 and 108 and indicated to the speaker during step 110 is given below:

| WORD 1 | LEFEME SEQUENCE # | WORD 2 | LEFEME SEQUENCE # | DISTANCE MEASURE |
|---|---|---|---|---|
| FAUGHT | (89331) | FAUT | (89431) | 0.000000 |
| FAUGHT | (89331) | THAUT | (264265) | 424.907013 |
| FAUGHT | (89331) | VAUGHT | (276919) | 609.116028 |
| FAUGHT | (89331) | VOUGHT | (280455) | 609.116028 |
| FAUL | (89332) | FAULL | (89371) | 0.000000 |
| FAUL | (89332) | GAHL | (97724) | 1583.287964 |
| FAUL | (89332) | GAHLE | (97726) | 1583.287964 |
| FAUL | (89332) | GALL | (98079) | 1583.287964 |
| FAUL | (89332) | GAUL | (99689) | 1583.287964 |
| FAUL | (89332) | GAULLE | (99701) | 1583.287964 |
| FAUL | (89332) | GOLL | (105069) | 1583.287964 |
| FAUL | (89332) | PHAL | (209613) | 0.000000 |
| FAUL | (89332) | THAL | (264167) | 424.907013 |
| FAUL | (89332) | VAAL | (274994) | 609.116028 |
| FAUL | (89332) | VALL | (275543) | 609.116028 | where "WORD 1" is the decoded word being tested, "WORD 2" are the existing words, and "DISTANCE MEASURE" is the distance measure or score resulting from lefeme sequence comparison. The distance measure may be a unitless, relative number depending on the type of distance metric employed. The "LEFEME SEQUENCE #" is merely an index number assigned to each lefeme sequence.

If, for example, the acoustic similarity threshold value were set to 1600.000000 and the name "FAUGHT" were uttered by the speaker, then "FAUT", "THAUT", "VAUGHT", and "VOUGHT" are identified as homophones and displayed to the speaker, since their respective distance measure falls within the threshold range (e.g., 0.000000 to 1600.000000). In fact, a distance measure of 0.000000 indicates that the two words compared share a common baseform. Using input device 24 (e.g., mouse), the speaker can then select (confirm) the decoded word or select one of the homophones. The same is true for the words shown above as a result of comparison to the word "FAUL".

Also, the above example shows, for instance, the words "FAUL" and "GAULLE" have distance 1583.287964. This procedure declared approximately 9000 rules for reducing similar words in a vocabulary of size 297000. Five rules are shown here:

| | |
|---|---|
| AARLES | :ARLES |
| AARLY | :ARLY ARLEAH ARLIA ARLEIGH ARLIE |
| AAROE | :ARRO ARO AYRAULT HERAULT |
| AARONDALE | :ARRUNDALE ERINDALE ARONDALE |
| ARRENDALE | ARRANDALE |
| AARONS | :ARRONS AIRONS ARENS ARENZ ARONS |

The present invention also preferably includes the capability to provide the speech recognition engine with an instruction to exclude any competing (i.e., identified as acoustically similar) existing words from the active vocabulary prior to real-time decoding. That is, the user can input a command to the processor 22, via the input device 24, to temporarily exclude certain competing existing words. This can also reduce the processing time associated with the leaf sequence comparisons. It is also possible that the user, once informed about confusible words, specifies to the processor that from now on, until further notice, the current pronunciation of the word is to be associated with that word.

It is to be understood that, based on experiments, distance ranges can be provided for words that are "homophones", "close to being homophones", and "non-homophones." In this case, the table would be set up to rank results in accordance with more than one threshold (i.e., the respective threshold values that separate the "homophone", "close to being homophone", and "non-homophone" categories).

Accordingly, whenever a word is compared, the user can review the tables or lists, ranked according to distance, and thus select the word he intended (step 112 of FIG. 3B). By displaying words categorized as "close to being homophones," the speaker is presented with words just outside the threshold range. This would permit the user to select a word that is merely outside the "homophone" category merely because the threshold value was set too narrow.

It is to be appreciated that the selection of a distance metric for calculating the distance measures is arbitrary and, as a result, different distance metrics may be employed in accordance with the invention. Thus, the distance metrics below are merely examples of known measuring techniques and are not intended to limit the invention.

The Kuhlback-Liebler distance between two Gaussian distributions is:

$$d < N(\mu_1, \sigma_1), N(\mu_2, \sigma 2) > = \sum_{i=0}^{i=n} \frac{\sigma_{1_i}^2}{\sigma_{2_i}^2} + \frac{\sigma_{2_i}^2}{\sigma_{1_i}^2} + (\mu_1 - \mu_2)^2 * \left( \frac{1}{\sigma_{1_i}^2} + \frac{1}{\sigma_{2_i}^2} \right) - 2$$

This distance metric is preferably modified to work with Gaussian mixtures by going through the set of mixtures in a first class and finding the minimum distance to a second class. Then, the total distance between the first class element (that had the minimal distance to a member of the second class) to all members of the second class is computed. Note that the weight of the mixture is used here to differentiate the relative importance of the members of the first class. The same procedure is done to elements of the second class. Then, the total distance between the first class and the second class is the sum of these distances. Other examples of distance metrics which may be employed are the L2 distance metric and the Mahalnobis or weighted Euclidian distance metric, to name a few.

This procedure is carried out for all leaves in the system and a symmetric matrix such as is shown below is produced identifying all the pair-wise distances between leaves. The distance matrix is subsequently used to find the total distance between two words. An example of such a symmetric matrix is as follows:

| 0 | 266.913 | 3210.71 | 8778.35 | 1834.3 |
|---|---|---|---|---|
| 266.913 | 0 | 3099.7 | 12318.4 | 1668.16 |
| 3210.71 | 3099.7 | 0 | 1583.21 | 1896.43 |
| 8778.35 | 12318.4 | 1583.21 | 0 | 891.11 |
| 1834.3 | 1668.16 | 1896.43 | 891.11 | 0 |

In this example, the first column and row represent leaf number 1. The second column and row represent leaf number 2, and so on. Therefore, the diagonal zeros (0) represent the fact that the leaf distance to itself is zero and the matrix is symmetric because the distance from leaf 2 to leaf 1 is the same as the distance from leaf 1 to leaf 2.

Nonetheless, regardless of the distance metric employed, the user selects either the decoded word or a related homophone (step 112) and the speech recognition engine then sends the decoded word or homophone to the application-specific system 18. If there are no words which fall at or below the acoustic similarity threshold value, then the decoded word is merely output from the speech recognizer 10 to the application-specific system 18. Alternatively, the speaker may also be given an opportunity to confirm that he wants the decoded word to be output to the system 18 (step 114 of FIG. 3B). That is, after determining that no other existing word is identified as a homophone, the processor 22 may indicate the decoded word to the speaker and the word will only be output to the system 18 if the speaker confirms that this is what he wants, e.g., by clicking on the word with the input device 24. If no homophone is identified but the word is still not the word that the speaker uttered, he may begin the process again by re-uttering the word or another word (returning to step 102).

In another embodiment of the present invention, after the homophones are identified (step 108 of FIG. 3A), they are stored (in memory 23) for use during a subsequent off-line correction session by the user or another person. In this manner, the user or someone else can edit a decoded text using the homophones identified at the time of the utterances to correct decoding errors which occurred at the time of the utterances. Thus, the editor can request the processor 22 to retrieve the list of homophones identified for a given word in the decoded text, the processor presents them to the user on the output device 26 (step 116 of FIG. 3C), and the editor then selects the correct intended word from the group of homophones (step 118 of FIG. 3C). Such an embodiment finds useful application particularly in the are of speech recognition dictation systems.

Figure 3D:
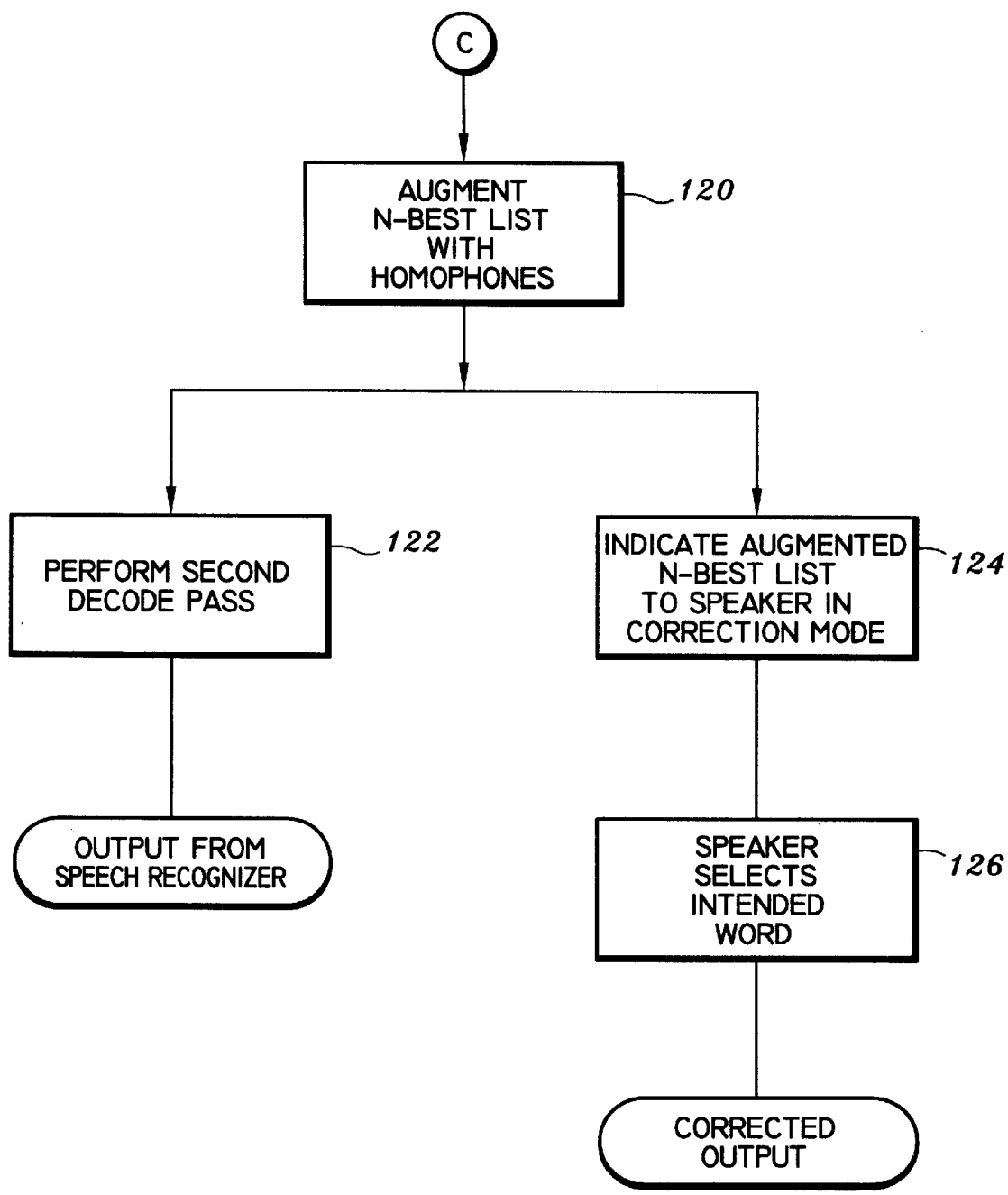

In yet another embodiment of the present invention, the identified homophones may be added to the N-best list generated for an uttered word to generate an augmented N-best list for each decoded word (step 120 of FIG. 3D). Then, a second decoding pass (e.g., a detailed match, an acoustic re-scoring, a language model re-scoring) is performed (step 122 of FIG. 3D) by the speech recognition engine 16 using the augmented N-best list in order to yield the result which is considered to be the top hypotheses for the uttered word. In this manner, there is no feedback to the user, rather, the speech recognizer utilizes the results to make the best selection. The second pass, e.g., re-scoring or detailed match, preferably includes increasing the beamwidth associated with the Viterbi algorithm thereby increasing the likelihood that all homophones are identified for the uttered word.

Alternatively, the identified homophones may be used to filter the N-best list produced by the speech recognizer to clean the list up in order that the list only includes acoustically similar words.

In still a further embodiment, the augmented N-best list is stored and presented to the user during an error correction session, as mentioned above. In this manner, the editor is presented with the homophones and the N-best list for each word in the decoded text (step 124 of FIG. 3D) and, thus, has a larger selection from which to choose the correct word (step 126 of FIG. 3D). Of course, the user could always select other words from the existing vocabulary to replace decoded words.

It is to be appreciated that, given the teachings herein, one of ordinary skill will contemplate many and varied applications for the homophone identification facility of the present invention. By way of example only, the present invention may complement or be integrated with IBM's ViaVoice or ViaVoice Gold software, speech toolkits, and research engines. In fact, any applications where erroneous decoding may occur due to acoustic similarity between vocabulary words are contemplated, including any English or foreign language speech recognition system or even any multilingual speech recognition system.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of identifying homophones of a word uttered by a user from at least a portion of existing words of a vocabulary of a speech recognition engine, the method comprising the steps of:

decoding the uttered word using the speech recognition engine to yield a decoded word;

computing respective measures between the decoded word and at least a portion of the other existing vocabulary words, the respective measures indicative of acoustic similarity between the word and the other existing words;

identifying the other existing words, associated with measures which correspond to a threshold range, as homophones of the uttered word; and outputting the identified homophones, wherein the user can select an identified homophone that corresponds to the word uttered by the user.

2. The method of claim 1, wherein the respective distance measures are calculated via a Kuhlback-Liebler distance metric.

3. The method of claim 1, wherein if at least one measure is not within the threshold range, providing the capability for the user to confirm that the decoded word is the uttered word.

4. The method of claim 1, wherein the outputting step comprises displaying the homophones to the user during a real-time decoding session.

5. The method of claim 1, wherein the outputting step comprises speech synthesizing the homophones for playback to the user.

6. The method of claim 1, further comprising the step of adding the homophones to an N-best list generated during the decoding step to form an augmented N-best list.

7. The method of claim 6, further comprising the step of performing a second decoding step using the augmented N-best list to determine a word with the highest likelihood of being the word uttered by the user.

8. The method of claim 7, wherein the second decoding step includes an acoustic re-scoring step.

9. The method of claim 7, wherein the second decoding step includes a language model re-scoring step.

10. The method of claim 6, further comprising the step of indicating, to the user, the augmented N-best list during a correction session.

11. The method of claim 1, further comprising the step of indicating, to the user, the identified homophones during a correction session.

12. The method of claim 1, wherein the step of computing respective measures further comprises the steps of:
   (a) comparing a leaf sequence associated with the decoded word to respective leaf sequences associated with the at least a portion of other existing words; and
   (b) generating respective distance measures in response to the comparisons, the respective distance measures indicative of acoustic distances between the compared leaf sequences.

13. The method of claim 12, wherein the leaf sequence comparison step further comprises performing a best match alignment process between leaf sequences of unequal phonetic length.

14. Computer-based apparatus for identifying homophones of a word uttered by a user from at least a portion of a vocabulary associated with a speech recognition system, the speech recognition system includes a speech input processor for receiving the uttered word and a speech recognition engine for decoding the uttered word to generate a decoded word, the apparatus comprising:
   a processor, operatively coupled to the speech recognition engine, for computing respective measures between the decoded word output from the speech recognition engine and the at least a portion of other existing vocabulary words, wherein the respective measures are indicative of acoustic similarity between the decoded word and the at least a portion of other existing vocabulary words, and wherein the processor identifies the other existing words, associated with measures which correspond to a threshold range, as homophones of the uttered word; and
   an output device for presenting the homophones identified by the processor to the user, wherein the user can select an identified homophone that corresponds to the word uttered by the user.

15. The apparatus of claim 14, wherein the output device comprises a display and the processor causes display of the identified homophones to the user on the display during a real-time decoding session.

16. The apparatus of claim 14, wherein the output device comprises a text-to-speech system and the processor causes speech synthesis of the identified homophones for playback to the user via the text-to-speech system.

17. The apparatus of claim 14, wherein the processor causes the addition of the homophones to an N-best list generated during the decoding to form an augmented N-best list.

18. The apparatus of claim 17, wherein the processor causes a second decoding pass to be performed using the augmented N-best list to determine a word with the highest likelihood of being the word uttered by the user.

19. The apparatus of claim 18, wherein the second decoding pass includes an acoustic re-scoring step.

20. The apparatus of claim 18, wherein the second decoding pass includes a language model re-scoring step.

21. The apparatus of claim 17, wherein the processor causes indication in accordance with the output device, to the user, of the augmented N-best list during a correction session.

22. The apparatus of claim 14, wherein the processor causes indication in accordance with the output device, to the user, of the identified homophones during a correction session.

23. The apparatus of claim 19, wherein the processor further performs the steps of:
   (a) comparing a leaf sequence associated with the decoded word to respective leaf sequences associated with the at least a portion of other existing words; and
   (b) generating respective distance measures in response to the comparisons, the respective distance measures indicative of acoustic distances between the compared leaf sequences.

24. The apparatus of claim 23, wherein the processor further performs a best match alignment process between leaf sequences of unequal phonetic length.

25. The apparatus of claim 17, wherein the processor calculates the respective distance measures via a Kuhlback-Liebler distance metric.

26. The apparatus of claim 17, wherein if at least one measure is not within the threshold range, the user confirming, via the input device, that the decoded word is the uttered word.

27. A program storage device, readable by a machine, tangibly embodying a program of instructions executable by the machine to perform method steps for identifying homophones of a word uttered by a user from at least a portion of existing words of a vocabulary of a speech recognition engine, the method steps comprising:
   decoding the uttered word using the speech recognition engine to yield a decoded word;
   computing respective measures between the decoded word and at least a portion of the other existing vocabulary words, the respective measures indicative of acoustic similarity between the word and the other existing words;
   identifying the other existing words, associated with measures which correspond to a threshold range, as homophones of the uttered word; and
   outputting the identified homophones, wherein the user can select an identified homophone that corresponds to the word uttered by the user.

28. The program storage device of claim 27, wherein the instructions for outputting comprise instructions for displaying the homophones to the user during a real-time decoding session.

29. The program storage device of claim 27, wherein the instructions for outputting comprise instructions for speech synthesizing the homophones for playback to the user.

30. The program storage device of claim 27, further comprising instructions for adding the homophones to an N-best list generated during the decoding step to form an augmented N-best list.

31. The program storage device of claim 30, further comprising the step of performing a second decoding step using the augmented N-best list to determine a word with the highest likelihood of being the word uttered by the user.

32. The program storage device of claim 31, wherein the instructions for the second decoding step comprise instructions for an acoustic re-scoring step.

33. The program storage device of claim 31, wherein the instructions for the second decoding step comprise instructions for a language model re-scoring step.

34. The program storage device of claim 30, further comprising instructions for indicating, to the user, the augmented N-best list during a correction session.

35. The program storage device of claim 27, further comprising instructions for indicating, to the user, the identified homophones during a correction session.

36. The program storage device of claim 27, wherein the instructions for computing respective measures comprise instructions for performing the steps of:

(a) comparing a leaf sequence associated with the decoded word to respective leaf sequences associated with the at least a portion of other existing words; and (b) generating respective distance measures in response to the comparisons, the respective distance measures indicative of acoustic distances between the compared leaf sequences.

37. The program storage device of claim 36, wherein the instructions for the leaf sequence comparison step further comprise instructions for performing a best match alignment process between leaf sequences of unequal phonetic length.

38. The program storage device of claim 27, wherein the respective distance measures are calculated via a Kuhlback-Liebler distance metric.

39. The program storage device of claim 27, further comprising instructions for providing the capability for the user to confirm that the decoded word is the uttered words if at least one measure is not within the threshold range.

* * * * *